United States Patent [19]

Soha

[11] Patent Number: 4,817,080
[45] Date of Patent: Mar. 28, 1989

[54] DISTRIBUTED LOCAL-AREA-NETWORK MONITORING SYSTEM

[75] Inventor: Michael J. Soha, Windham, N.H.

[73] Assignee: Digital Equipment Corporation, Maynard, Mass.

[21] Appl. No.: 18,227

[22] Filed: Feb. 24, 1987

[51] Int. Cl.[4] .............................. H04J 1/16; H04J 3/14
[52] U.S. Cl. ......................................... 370/17; 370/13
[58] Field of Search ...................... 370/17, 13, 85, 88; 340/825.05, 825.06

[56] References Cited

U.S. PATENT DOCUMENTS

| | | |
|---|---|---|
| 4,516,216 | 5/1985 | Armstrong . |
| 4,530,090 | 7/1985 | Priamo et al. ........................ 370/85 |
| 4,558,317 | 12/1985 | Armstrong .................... 340/825.06 |
| 4,597,078 | 6/1986 | Kempf . |
| 4,680,754 | 7/1987 | Fechalos ............................... 370/85 |
| 4,688,212 | 8/1987 | MacGinitie et al. .................. 370/85 |

Primary Examiner—Douglas W. Olms
Assistant Examiner—Wellington Chin
Attorney, Agent, or Firm—Nutter, McClennen & Fish

[57] ABSTRACT

A monitoring system for a local-area network (10) has a distributed organization, in which a monitor manager (34) on the network receives information from individual monitor units (32 and 40) connected to different buses (12 and 14) of the local-area network (10). Each monitor unit employs a plurality of counters in a packet memory (50) that are dynamically allocated to specific packet characteristics as new packet characteristics appear on the network. A look-up table (56) contains the association between counters and the characteristics with which they are associated, and a look-up engine (54) operates the look-up table (56) in such a manner as to enable it to search for the location of specific counters by employing a binary-search method. In this way, all processing for a given packet can be performed within the minimum packet time.

10 Claims, 6 Drawing Sheets

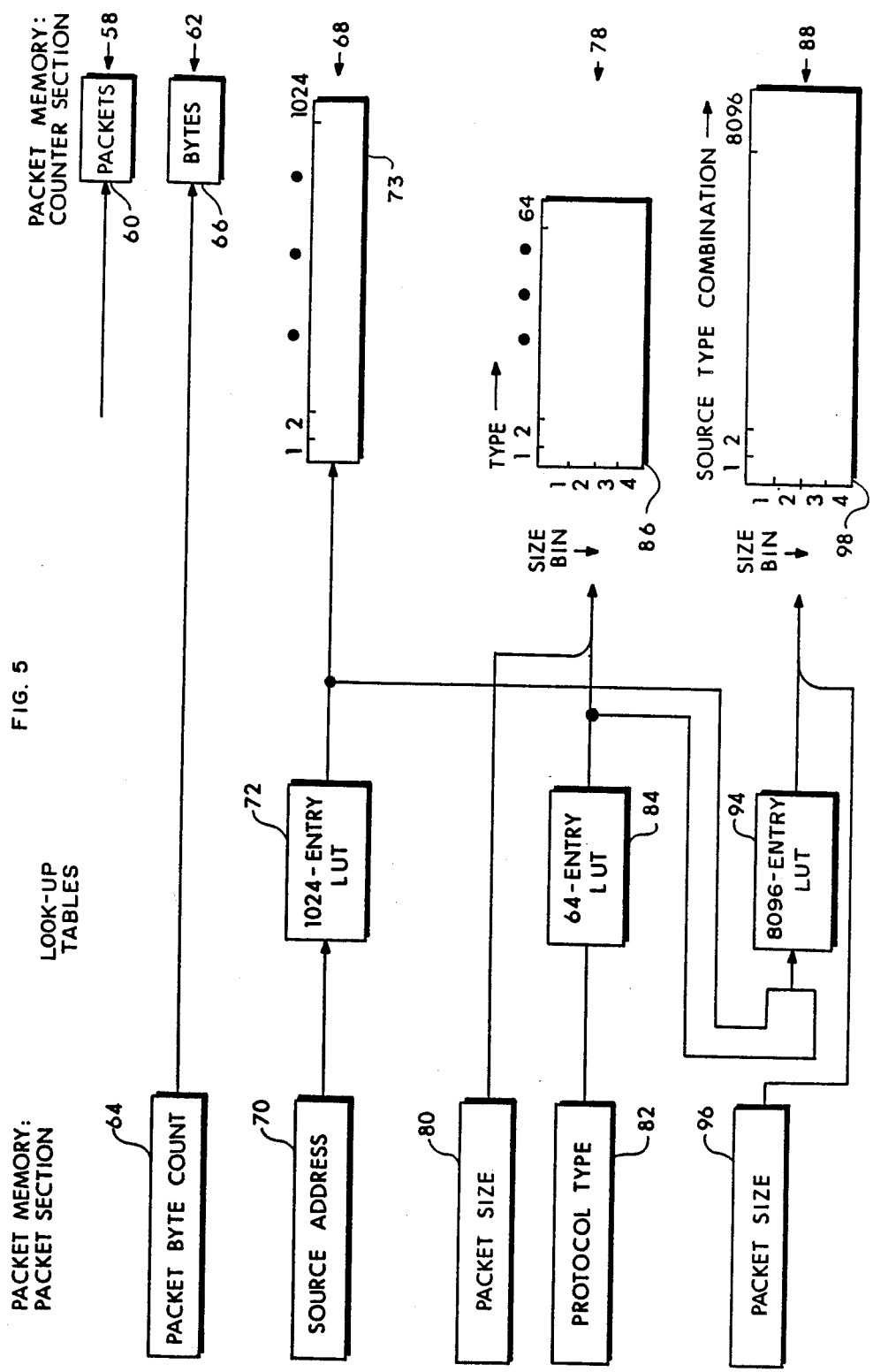

DISTRIBUTED LOCAL-AREA-NETWORK MONITORING SYSTEM

BACKGROUND OF THE INVENTION

The present invention is directed to monitors for local-area networks.

Local-area networks are communications systems for enabling data-processing devices to communicate with each other. Many stations on the local-area network are likely to be relatively autonomous, requiring communication with other stations only occasionally. Others require more-frequent communication, and, of course, the amount of communication required by a particular station can vary from time to time. Moreover, stations are often added to, removed from, and moved from place to place within local-area networks without a great deal of central control. For this reason, the manager of the local-area network needs some type of apparatus that monitors the local-area network to collect information such as the amount of traffic used by each source and the communications protocols that the various sources are using. These and other types of information can help to detect impending problems or current system failures.

In the typical local-area network, the basic unit of communication is the packet; any message from one station to another contains at least a single packet, which contains various fields of information in accordance with a predetermined protocol. The information typically includes the identity of the source station, the identity of the destination station, and various other information concerning the characteristics of the packet. A typical monitor monitors the communications bus of the local-area network and searches each packet for predetermined information.

The information to be obtained is typically specified by the user, and the amount of processing required in response to each packet typically depends on the amount of information the user specifies. For a given amount of user-specified information, the length of processing per packet is fixed. But the packet length varies. Some packets are quite long, but ETHERNET and IEEE 802.3 packets can be as short as 67.2 microseconds, which is the minimum packet length for these protocols. Accordingly, a burden is imposed on the user to insure that the amount of information requested is not so great as to require more than 67.2 microseconds of processing. Otherwise, the monitor will miss some packets if the packet rate gets too high, and the statistics that it generates will not be reliable.

Another aspect of the monitoring problem appears particularly when two local-area networks are connected. A single local-area-network leg may include, say, a single coaxial cable to which all of the stations are connected. Another leg, which conducts signals on a separate coaxial cable, typically is connected to the first by a bridge, which forwards signals from one leg to the other if the bridge has not observed that the destination is on the same leg as the source. If, in accordance with information obtained by the bridge, it is apparent that the destination station is on the same leg as the source station, the bridge does not forward the message to the second leg. This conserves overall local-area-network bandwidth, but it also means that messages carried on one leg are not necessarily seen on the other. Therefore, it takes more than one monitor to gather comprehensive statistics.

An object of the present invention is to monitor a local-area network in a fashion that guarantees complete statistics regardless of the packet rate and regardless of how many of a predetermined group of possible statistics the user specifies. Another object is to do so in a way that results in complete statistics even if the local-area network is separated into several legs. A further object is to monitor local-area networks in an efficient, reliable manner. Other objects will become apparent as the description proceeds.

SUMMARY OF THE INVENTION

Certain of the foregoing and related objects are achieved in a monitor whose resources are distributed among a monitor-management unit and one or more basic monitoring units. The monitor units collect statistics by monitoring respective legs of the local-area network to which they are connected, and they transmit these statistics periodically to the monitor-management unit, which processes the data sent by the monitors and generates displays for the user.

By distributing the resources in such a fashion, one can obtain information from all of the local-area-network legs.

Another aspect of the invention relates to the way in which counters are located. The monitor unit includes a plurality of counters, and it associates a counter with each new characteristic (e.g., new source address, new protocol type) of the packets that it receives. In order to determine which counter to increment when it receives a particular field value, the monitor unit employs a look-up table. Each location in the look-up table has a tag segment and a pointer segment. The tag segment contains a code representing a particular packet characteristic, and the pointer segment contains the address of the counter that is to contain the number of occurrences of that particular characteristic. When the monitor receives a packet having a particular characteristic, it searches the look-up table for a location whose tag segment contains the code for that characteristic. Once that location has been found the monitor unit increments the contents of the counter designated by the contents of that location's pointer segment.

According to this aspect of the invention, the organization of the look-up table greatly facilitates the search, because each new value of the packet field is placed into such a location in the look-up table that the tag-field contents progresses monotonically with the addresses of the look-up-table locations. Therefore, the search can be performed as a binary search, whose length increases only as the logarithm of the size of the look-up table. This allows enough statistics of interest to be collected for even the shortest packets that the processing can be essentially independent of the specific information that the user requests.

BRIEF DESCRIPTION OF THE DRAWINGS

These and further features and advantages of the present invention are described in connection with the accompanying drawings in which:

FIG. 5 is a diagram depicting the processing that the monitor unit performs when a communications bus that it is monitoring carries a single-destination packet.

DETAILED DESCRIPTION OF THE PREFERRED EMBODIMENTS

Figure 1:
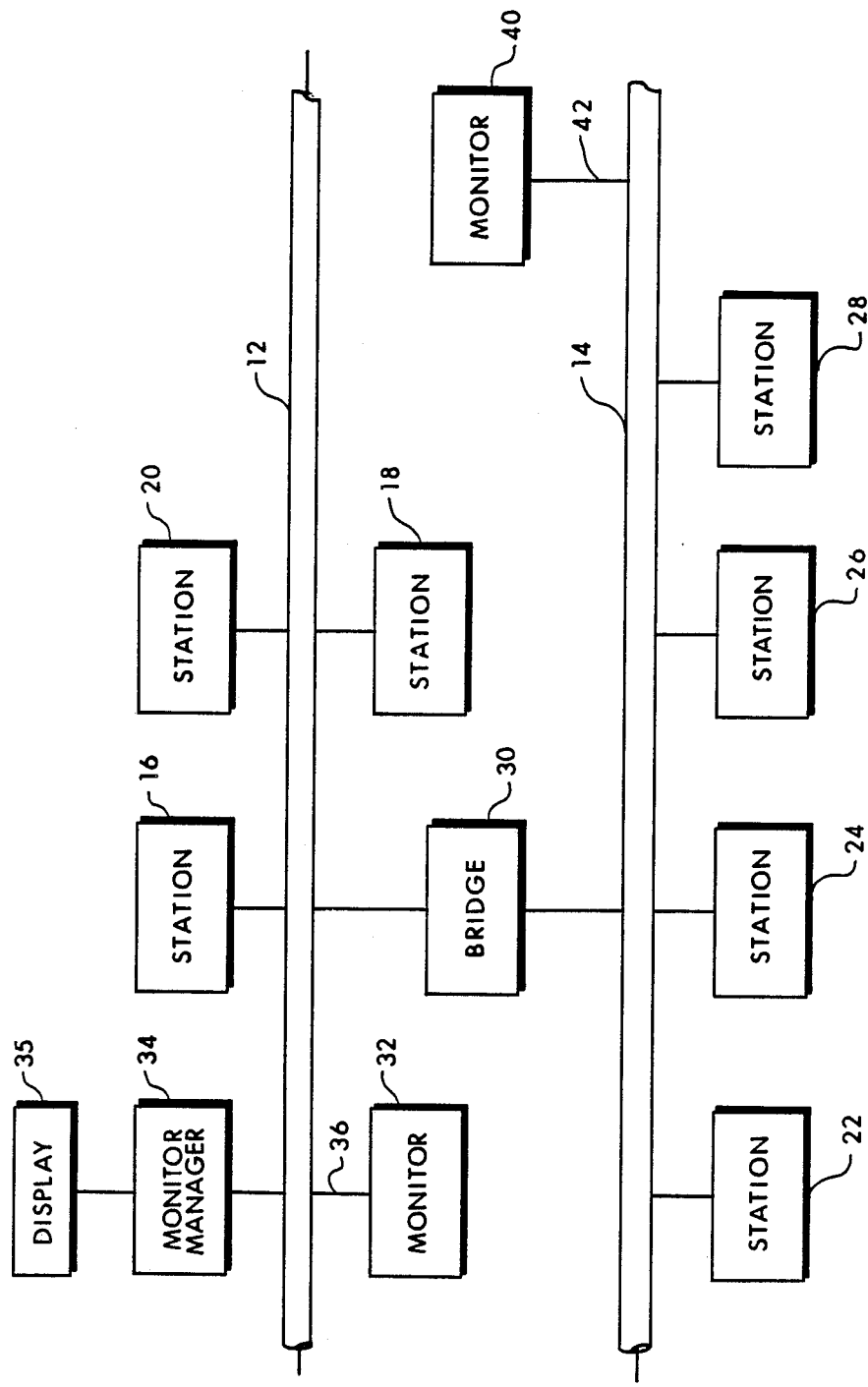
FIG. 1 is a block diagram of a local-area network to which the monitoring system of the present invention is connected.

FIG. 1 depicts a local-area network 10 that includes two legs in which communication occurs over two respective coaxial-cable communications bases 12 and 14. Although the illustrated network is a bit-serial network, it will be apparent that the teachings of the present invention apply to parallel-bus networks as well.

FIG. 1 also depicts three station units 16, 18, and 20 interconnected by bus 12 and four station units 22, 24, 26, and 28 interconnected by bus 14. Each of the stations may be a processor or disk drive, for instance, and include interface circuitry for sending and receiving bus signals in accordance with the local-area-network protocol.

In order to communicate with another station, one of the stations, say, station 16, contends for control of the bus 12 to which it is connected and, when it has obtained control, places signals on the bus in a predetermined packet format in accordance with well-known techniques. The format, for instance, may be of the type depicted in FIG. 2. As FIG. 2 indicates, the first six bytes of the packet constitute a destination-address field. Each station has a unique address, and the first six bytes are the address of the station that is to receive the packet.

Each station on bus 12 inspects the destination-address field to determine whether it is that station that is to receive the packet. For the sake of example, we will assume that the first six bytes contain the address of station 18. In the case of station 18, a comparison of the first six bytes with the unique address of station 18 indicates equality, so station 18 processes the remainder of the packet. All other devices, upon noting a negative comparison of the destination address with their addresses, do not process the packet but instead monitor the bus 12 only for header signals (not shown in FIG. 2) that indicate the beginning of a subsequent packet.

Figure 2:
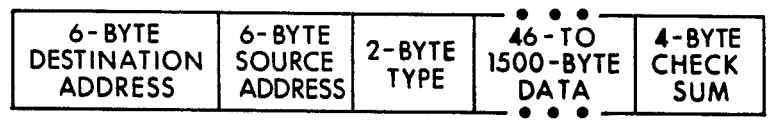
FIG. 2 is a diagram of a typical format of a signal packet connected by the communications buses of the local-area network of FIG. 1.

The remainder of the packet contains the source address, as FIG. 2 indicates, which the destination station may require in order to respond properly to the received packet. A two-byte field following the source field indicates the type of packet in accordance with a predetermined protocol, and this field gives the destination station further information concerning the interpretation that it is to give the data that follow. If the value of this field is less than a decimal 1501, the packet is an IEEE 802.3 packet, and the value of this field then indicates the length of the subsequent, data field. Otherwise, the value represents the packet type in accordance with the ETHERNET protocol.

The subsequent field contains the actual data that it is the object of the packet to transmit. The length of this field varies from packet to packet, as the discussion of the type field implied. The last four bytes are error-correction bytes that the local-area-network interface examines to determine whether an error in transmission has occurred.

If station 16 sends a packet to station 18, bus 14 is not involved. However, if the destination had been, say, station 22, it would be necessary to forward to bus 14 the information contained in the signals on bus 12. This is the function of a bridge unit 30. Bridge unit 30 monitors the traffic on both buses 12 and 14, and it compiles a list of the source addresses that it receives from bus 12 and a list of the source addresses that it receives from bus 14. If, in inspecting a packet conducted by bus 12, it sees a destination address that is contained in its list of source addresses for that bus, bridge 30 does not forward the packet contents to bus 14, so bus 14 is not subjected to unnecessary traffic. On the other hand, if the destination address that bridge 30 detects in a packet on bus 12 is not in its list of source addresses for bus 12, it stores the packet, contends for control of bus 14, and places the information contained in that packet onto bus 14. If the protocol that prevails on bus 14 is different from that which prevails on bus 12, bridge 30 additionally translates between protocols.

According to the present invention, a monitoring system is provided that includes at least a basic monitor unit 32 and a host unit 34, referred to below as a monitor manager. The monitor unit 32 is connected by one port 36 to bus 12 so that it can monitor bus 12 and keep counts of packets having various characteristics. It then sends the resultant statistics over the bus to a monitor manager, which performs higher-level processing to generate information placed on a display 35 for users.

With only the basic unit 32 and the monitor manager 34, it is possible to monitor only the traffic that appears on bus 12. Typically, traffic between stations 22 and 24, for instance, would not show up on bus 12, and a monitor system that can be connected to only one of the networks would miss some of the traffic. One of the strengths of the distributed arrangement of the present invention is that the monitor system has n expandable architecture; as additional legs are added to the single local-area network, additional monitor units can be added to the single monitor system to keep track of the traffic on additional legs. Even though additional monitor units are added, the output to the human user is still centered in one device, namely, the monitor manager.

In the system depicted in FIG. 1, an additional monitor unit 40 monitors bus 14 by means of a port 42, and it transmits its statistics over bus 14 to the monitor manager 34 by way of the bridge 30 and the other communications bus 12.

Figure 3:
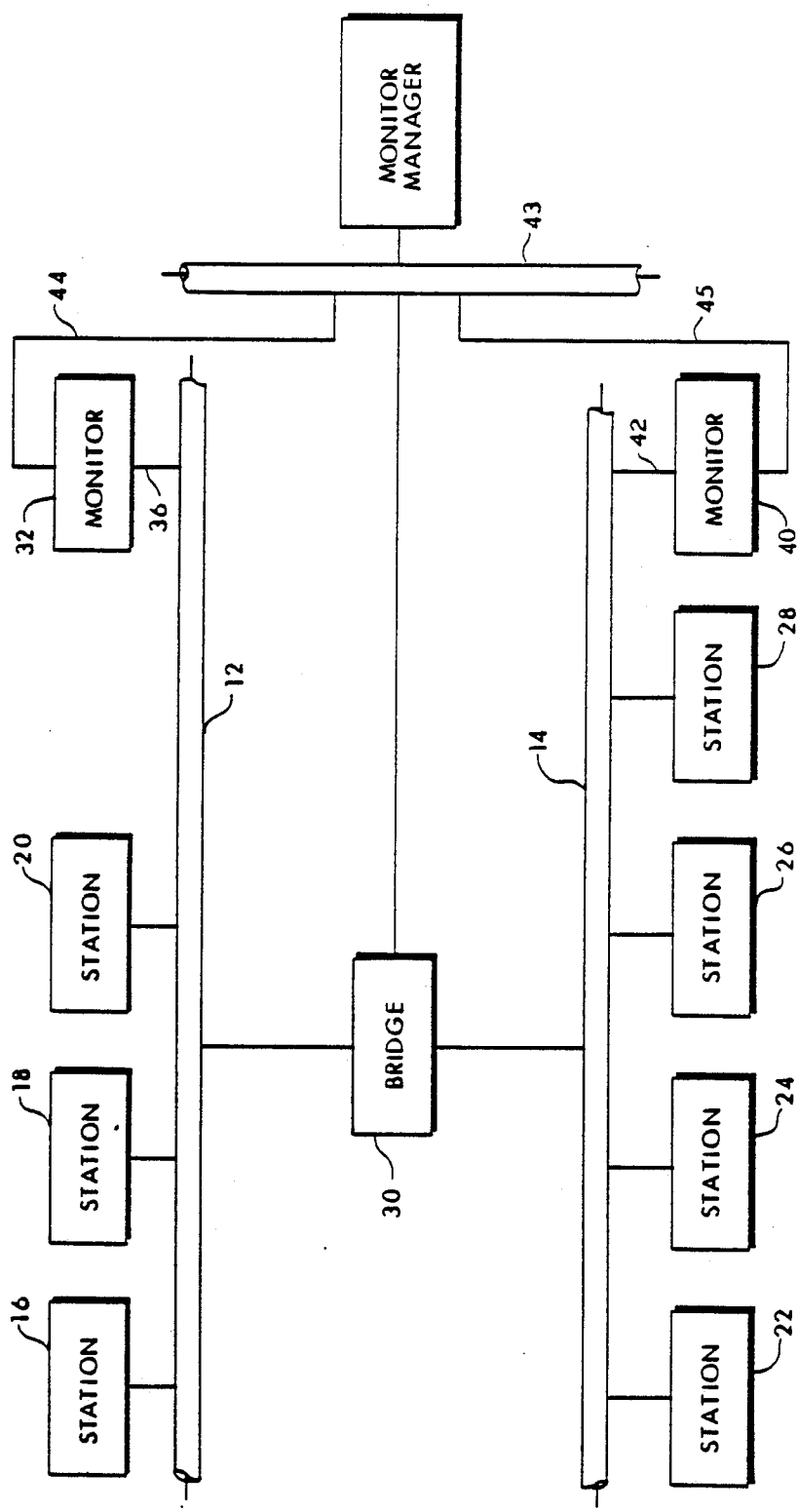
FIG. 3 is a block diagram of an alternate embodiment of the monitoring system.

Since the communication between the monitor units 32 and 40 and the monitor manager 34 occurs by way of the local-area-network buses 12 and 14, the communication between the two parts of the monitoring system uses some bus bandwidth. This ordinarily is acceptable. To make the monitoring system unobtrusive, though, a separate, dedicated bus can be employed for communication within the monitoring system, as FIG. 3 illustrates. Specifically, the monitor manager 34 in FIG. 3 is connected not to the local-area network itself but rather to the separate monitor-system bus 43. In this arrangement, the basic monitor units 32 and 40 are connected by second ports 44 and 45, respectively, to the monitor-system bus 43 rather than to the local-area-network bus 12 or 14.

The monitor manager 34 is simply an appropriately programmed general-purpose processor with interface circuitry for communicating by way of the communications bus 12 and an output device for presenting an output to a human user. The processing that the monitor manager performs on the statistics that it obtains from the monitor units is conventional, and its processing load is minimal because monitor units 32 and 40 perform the bulk of the monitoring functions. Accordingly, the monitor manager will not be discussed further.

The basic monitor units 32 and 40 are specially arranged for fast processing. Monitors 32 and 40 are identical, and basic monitor unit 32 will be described in connection with FIGS. 4, 5, and 6.

Figure 4:
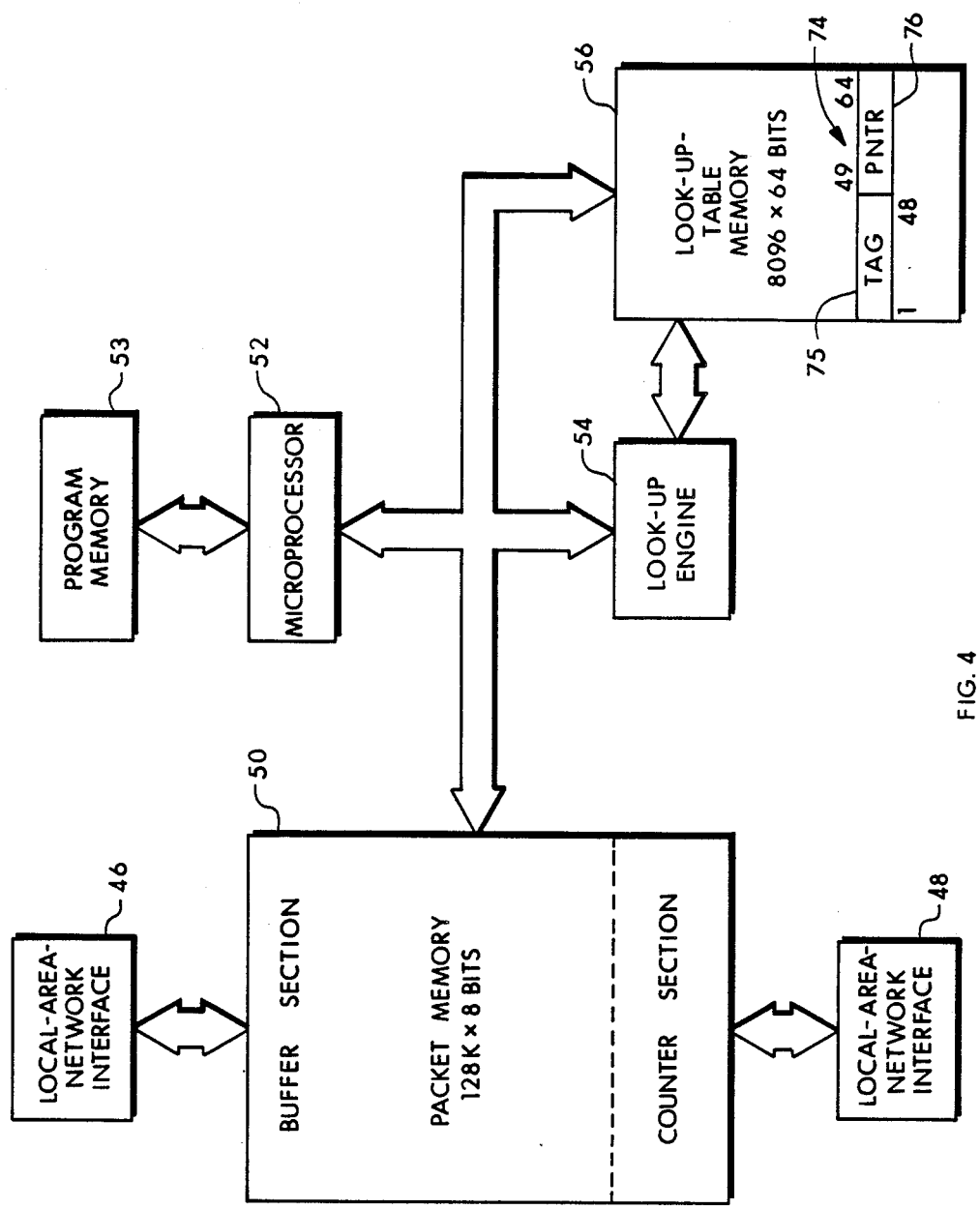
FIG. 4 is a block diagram of the hardware arrangement of one of the monitor units depicted in FIG. 1.

FIG. 4 depicts the hardware arrangement of monitor 32. The hardware is essentially the same as that of an inter-network bridge of the type described in U.S. Pat. No. 4,597,078 to Kempf, which is hereby incorporated by reference. However, the programming differs so that it provides the functions of a monitor rather than of a bridge.

Monitor unit 32 includes two conventional local-area-network interface units 46 and 48, which are connected in a conventional fashion to a conventional two-port packet memory 50. The local-area-network interfaces 46 and 48 are devices for receiving the bit-serial information from a bus, assembling it into bytes, inspecting the check sum to insure that no errors have occurred, and then placing the contents of the packet in successive packet-memory locations. The interfaces 46 and 48 and also place certain housekeeping information, such as packet size and the locations in which they have stored the packet contents, into the packet memory. When one of the interfaces 46 and 48 has completed this operation, it interrupts a microprocessor 52, which operates from a program stored in its program memory 53 and begins the operation of updating counters (actually, packet-memory locations) that maintain the statistics that it is the purpose of the monitor unit to compile.

In general, the microprocessor 52 responds to the interrupt by fetching from the packet memory 50 the contents of a location that the interface 46 has filled with a pointer to the location of the packet that it has just placed in the packet memory 50. The microprocessor then fetches, say, the contents of the source-address field of the packet that starts at that location, and it thereby determines that it must increment the counter that represents the number of packets that that particular source has transmitted. To find that counter, microprocessor 52 sends this source address to a look-up engine 54 of the type described in the Kempf patent mentioned above. The specifics of the look-up engine 52 are found in the Kempf patent and will not be repeated here. Its general purpose, however, is to employ a look-up table 56 to find the address of the memory location in the packet memory 50 that serves as the counter of the number of packets sent by the source whose address the microprocessor 52 has applied to the look-up engine 54.

As a result of the operation of the look-up engine 54, the microprocessor 52 obtains the address of the counter that is to be incremented. It reads the contents of that counter, increments those contents, and stores the result back into the counter. Typically, the microprocessor 52, look-up engine 54 and look-up table 56 perform this operation not only for a counter that represents the number of packets sent by a particular source, but also for counters that count the number of packets having other specific characteristics. This compilation of statistics will be described in connection with FIGS. 5 and 6.

FIG. 5 is a diagram of the processing that the circuitry of FIG. 4 performs on a single-destination packet. As was stated above, the first field in the packet designates a destination to which the packet is addressed. Ordinarily, this is a single destination. However, there are some addresses that designate, not a single station, but a plurality of them. Such addresses are referred to as "multicast" addresses. In addition to responding to its own unique destination address, some stations may additionally respond to one or more multicast addresses, to which other stations may also respond. The processing depicted in FIG. 5 is performed in response to those packets whose destination address is not a multicast address. If the destination-address field contains a multicast address, the monitor unit performs the processing that will be described in connection with FIG. 6.

The processing that FIG. 5 illustrates is exemplary; the program memory 53 can contain instructions for performing other types of processing. However, one of the strengths of the organization described in the specification is that it lends itself to standard programming of the basic unit. That is, the monitor unit operates fast enough to collect so much information within the minimum packet time that it will have collected the raw data for most information that the user subsequently requests from the monitor manager 34. With a standard program that runs in less than the minimum packet time, the integrity of the data-collection process does not depend on what information the user has requested.

The user does not have to specify the statistics that the basic unit will compile, so the basic programming can readily be arranged to take place in less than the minimum packet time. Therefore, all packets will be processed. The specific information that the user desires is given to the monitor manager 34, which picks and chooses among the statistics that the basic monitor units 32 and 40 provide.

In order to understand FIG. 5, it should be recognized that the packet memory 40 is organized in two sections. The first section acts as a packet buffer; it temporarily stores the contents of the packets that the local-area-network interfaces 46 and 48 receive. The second section consists of locations that serve as counters. Once these counters have been updated, the microprocessor notifies the local-area-network interfaces 46 and 48, which are then free to re-use the locations in the first section that contain the contents of the packet whose storage is no longer necessary.

In FIG. 5, the blocks on the left-hand side of the figure represent obtaining input information from the first, packet-buffer section, while the blocks on the right-hand side of the drawing represent the resultant updating of counters in the second section.

The first level 58 of FIG. 5 represents the first operation of the microprocessor, which is to respond to an interrupt from a local-area network 46 or 48 by fetching the contents of a predetermined location in the packet memory 50 that serves as a packet counter, incrementing those contents, and writing them back into that location. Level 58 contains only block 60, on the right side of the drawing to represent the operation on the packet counter; it has no block on the left side. This indicates that the microprocessor does not need to know anything about the packet in order to perform this function; it needs only to know that a packet was received, and its interruption by local-area-network interface 46 or 48 represents this fact.

The second level 62 of FIG. 5 has a block 64 on the left side that represents the microprocessor's fetching from the packet memory the contents of a location in which the local-area-network interface 46 or 48 has stored its count of the number of bytes in the packet that it has read. Block 66 on the right side of level 62 represents the updating of the location in the second counter section of packet memory 50 that serves as a counter for the total number of bytes that have been transmitted on the local-area network. The microprocessor fetches the contents of that location, adds to them the packet byte count that it fetched from the packet-storage part of the packet memory 50, and returns the results to that location.

In both of the operations represented by levels 58 and 62, the location of the counter to be updated was predetermined; the program memory 53 contains the locations of the packet and byte counters, so the microprocessor does not have to employ the look-up engine 54 and the look-up table 56 in order to locate the counter of interest. In contrast, level 68 represents a process that requires these elements.

In this process, the microprocessor fetches the contents of the packet-buffer location in which the local-area-network interface 46 or 48 has stored the contents of the source-address field of the packet that it received. Block 70 represents this step. Next, the microprocessor 52 must increment a counter that represents the number of times packets have been sent by the source having that source address. In order to determine which is the proper counter, it must operate the look-up engine 54 and look-up table 56 in a manner that will be described in more detail below. Block 72 represents this part of the operation, the result of which is the address of the counter that must be incremented. Block 73 represents the part of the packet-memory space 50 dedicated to source addresses. As block 73 indicates, 1,024 locations are allocated to counters for sources; the monitor unit 32 has the capacity to keep a packet count for each of 1,024 sources.

The look-up table 56 is a 8096-location-by-64-bits/location memory. As FIG. 4 illustrates, each location 74 is divided into two segments, a 48-bit tag segment 75 and a 16-bit pointer segment 76. Within this 8096-location memory is a 1024-location portion dedicated to looking up counters representing source addresses. In the process represented by level 68, the microprocessor 52 supplies to the look-up engine 54 (FIG. 4) the contents of the source-address field that it has fetched from the packet memory 50, and it operates the look-up engine 54 to search through the 1024-location section of the look-up table 56 directed to finding protocol-type counters. Within that section of the look-up table 56, the look-up engine 54 searches the locations for one whose tag segment contains the source-address code that the microprocessor 52 supplied to the look-up engine 54. If it finds such a location, it sends microprocessor 52 the contents of the pointer segment of that location, and the microprocessor 52 increments the contents of the location whose address the pointer represents.

The present invention advantageously adapts to use as a monitor the organization described in the Kempf patent for a bridge unit. This organization enables fast look-up-table searching so that the processing depicted in FIG. 5 can be performed in less than the minimum packet time.

The Kempf patent mentioned above describes the operation in detail, so the detailed operation will not be described here. In general, however, the look-up engine 54 searches through the designated section of the look-up table 56 for a location whose tag segment contains the contents supplied to the look-up engine by the microprocessor 52. If it does not find any location whose tag contents have the searched-for value, it notifies the microprocessor 52, which operates the look-up engine to insert the source address into the proper position in the source-address look-up table in the look-up-table memory 56 in such a fashion that the tag entries in the source-address look-up table are in order in accordance with the addresses of the locations in which they are stored. (I.e, the source addresses increase monotonically or decrease monotonically with increasing location address.) Specifically, the look-up engine removes the last entry in the look-up table from its location, move it to the location whose address is one higher, and repeats this sequence for each previous entry until it reaches the point at which the new entry should be inserted. This preserves the required order.

This much of the operation is described in detail in the Kempf patent. In addition to these steps, the microprocessor 52 in the illustrated system allocates a counter location in packet memory 52 to the new source address, and it places the address of the new counter location into the pointer segment of the look-up-table location whose tag segment was just filled with the new source address. Additionally, it fills this counter location with a value of unity to indicate that one packet has been sent by the newly detected source.

The reason for preserving the order in the look-up table is that the order preservation makes the table amenable to a binary search. Specifically, in the search mentioned above, the look-up engine initially inspects a location halfway through the source-address look-up table and compares its tag contents with the source address for which it is searching. If the source address for which it is searching is higher than the tag contents, it has eliminated half of the look-up table—i.e., the half with addresses lower than that of the current location—from consideration, and it repeats the process at a location halfway through the part of the look-up table that remains under consideration. In this way, each step of the search eliminates from consideration half of that part of the look-up table that previously was under consideration. This continues until either the tag segment of a location contains the source address for which the look-up engine 54 is searching or a predetermined number of steps have occurred, namely, a number of steps equal to the base-2 logarithm of the size of the look-up table. In the latter case, the search will have failed, and the look-up engine 54 reports to the microprocessor 52 that the look-up table does not contain the source address in question. By using a binary-search method, the look-up engine 54 can complete any search in less than four microseconds.

Level 78 represents the next process. In this process, the microprocessor 52 fetches from the packet memory 50 the contents of the locations that contain the packet size and the contents of the packet's third, protocol-type field. Blocks 80 and 82 represent these operations. The microprocessor 52 then performs an operation represented by block 84 of FIG. 5, it operates the look-up engine 54 of FIG. 4 to find the beginning address of a four-counter group associated with the protocol type that the type field represented. The microprocessor 52 then increments either the counter associated with that address or a counter whose address differs from the pointer by 1, 2, or 3, in accordance with the packet size.

Specifically, if the packet size that the microprocessor 52 has fetched is below a certain threshold, the microprocessor concludes that the packet belongs in size bin number 1, and it increments the contents of the location that the pointer designates. If the packet size was between that threshold and a subsequent threshold, the microprocessor 52 concludes that the packet falls in size bin number 2, and it increments the contents of the location whose address is one greater than the contents of the pointer segment If the packet size falls within a third range, the microprocessor 52 increments the contents of a location whose address is 2 greater than the pointer, while a location whose address is 3 greater than the pointer is incremented if the packet size is within a fourth, upper range. The counter space in packet memory 50 includes a 64×4 array of locations dedicated to the results of this process. Block 86 represents this array, each element of which is a counter that represents a packet of a particular protocol type within a certain size range.

Level 88 represents the last process that the monitor 32 performs in response to reception of a single-destination packet. The purpose of this process is to update counters that represent combinations of sources and types. Each of these counters represents the number of times a given source has used a given protocol Since the look-up-table tag field is only 48 bits wide, it is not possible simply to concatenate the 48-bit source address with the 16-bit protocol-type code to create a tag. Instead, the microprocessor 52 creates a tag by concatenating the respective 16-bit pointers into which the source address and protocol type were mapped in the processes of levels 68 and 78. It applies the resultant tag to the look-up engine 54 (FIG. 4) so as to locate one of 8,096 counters. Block 94 represents this look-up-table search.

The process of level 88 is similar to the process described in level 78, in which the counter that is incremented is either the counter designated by the results of the look-up-table search or one of the counters associated with the three immediately subsequent addresses. Block 96 represents the microprocessor's fetching of the packet size from the packet memory 50 in order to determine whether to increment the counter designated by the output of the look-up table 56 or to add 1, 2, or 3 to that output in order to designate another counter in accordance with the range into which the packet size falls. Block 98 represents the array of locations in packet memory 50 allocated to counters for this function.

All of the processes depicted in FIG. 5 occur within the minimum packet time, and when the process represented by level 88 is completed, the monitor unit 32 is ready to process the next packet.

Figure 6:
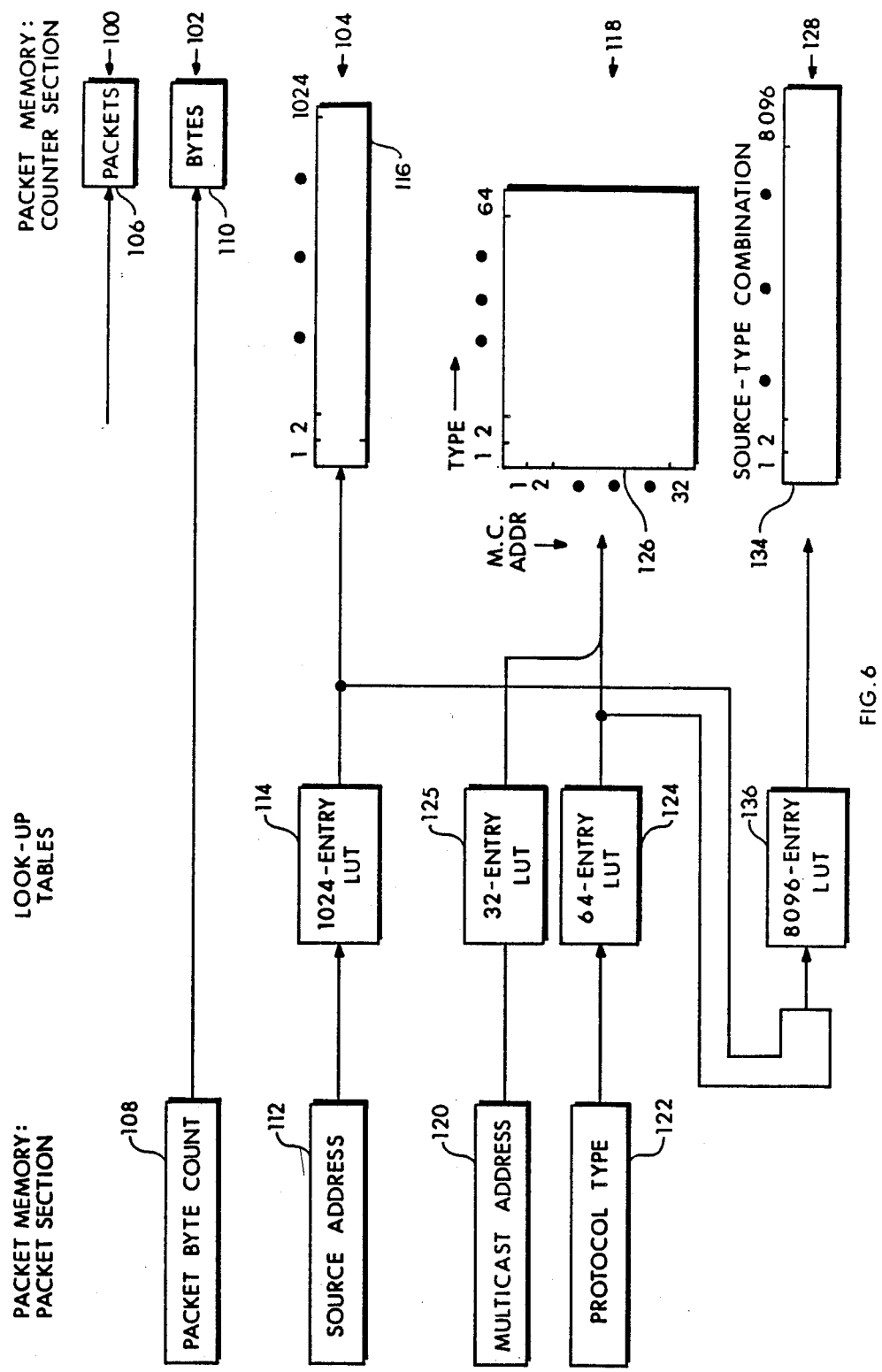
FIG. 6 is a diagram depicting the processing that the monitor unit performs when a communications bus that it is monitoring carries a multicast-destination packet.

FIG. 6 depicts the processing of a multicast packet in a manner the same as that in which FIG. 5 depicts the processing of a single-destination packet. In FIG. 6, levels 100, 102, and 104 represent essentially the same processing as do levels 58, 62, and 68 of FIG. 5; their blocks 106, 108, 110, 112, 114, and 116 correspond to similar blocks 60, 64, 66, 70, and 72 of FIG. 5. These three processes are the same for a multicast packet as they are for a single-destination packet, with the exception that the results of the first two processes are kept in counters separate from those that are incremented on the reception of a single-destination packet. It is sometimes desirable to segregate the counts for single-destination packets from those for multicast packets, and the monitor manager 34 can easily add the counts from corresponding counters when totals are desired. On the other hand, blocks 72 and 114 represent use of the same look-up tables, and blocks 73 and 116 represent incrementing the same counters.

The fourth process, represented by level 118, is different from any of the processes depicted in FIG. 5. In accordance with this process, the microprocessor 52 fetches information from the packet memory to determine the contents of the destination field and the type field. Blocks 120 and 122 represent these steps. The microprocessor 52 then consults the look-up engine 54 and a 64-entry section of memory 56 to find the beginning address of a 32-location group of counters that have been allocated to the protocol type indicated by the type field of the packet. Block 124 represents this step. Next, the microprocessor 52 consults the look-up engine 54 and a 32-entry section of memory 56 to find which counter in the 32-counter group is associated with the multicast address contained in the destination field of the packet. Block 125 represents the second look-up table search. Block 126 represents the 64×32 array of counters associated with this process The next process, represented by level 128, is similar to the process represented by level 88 of FIG. 5; it collects statistics on combinations of source and protocol type. It differs from the level-88 process in that the statistics are not broken out by packet size. The process of level 128 concatenates the pointers produced in searches 114 and 124 to produce a tag for a search, represented by block 136, that determines which of 8,096 counters represented by block 134 to increment Like the counter identification in the process represented by level 118, the packet characteristic on which the process represented by level 128 is based is a combination of the contents of two fields. In the processing represented by level 128, however, the look-up-table search represented by block 136 (and, similarly, the search represented by block 94 of FIG. 5) uses as its input the combination of the source address and protocol type, whereas the search represented by block 124 uses only the protocol type.

The reason for this difference is that the microprocessor 52 allocates only a single new counter to the process of level 128 when it receives a new combination of source address and protocol type, so the counters associated with a particular protocol type can be scattered around the 8,096-element group of counters. In contrast, the process represented by level 118 allocates 32 consecutive counters each time a new protocol type is encountered, so all counters associated with a given protocol type have consecutive addresses. Clearly, the method used in level 118 could be used in level 128, and vice versa, but the choices were made because of the judgment that the two situations required different compromises between the efficiency of memory allocation afforded by the level-128 method and the speed of searching afforded by the level-118 method.

Like the processing represented by FIG. 5, the processing represented by FIG. 6 takes less time than the transmission of a packet of minimum length. The monitor unit 32 is therefore guaranteed to count each packet.

The monitor 32 also performs two further functions. First, the microprocessor 53 periodically operates one of the interfaces 46 and 48 to cause it to transmit the contents of selected counters to the monitor manager 34. Second, microprocessor 53 inspects the source code of each packet to determine whether the source is the monitor manager 34 and the destination is the monitor unit 32. If so, it collects statistics on the packet in the normal manner, but the microprocessor 53 also treats the data field as an instruction, which the microprocessor performs by, for instance, sending a packet containing specific information requested by the monitor manager. As was stated above, such exchanges of information may take place on a separate, statistics-bearing communications bus dedicated to the monitoring function, or the bus 12 may itself serve as the statistics-bearing bus. The processing of such instructions occurs in the background, i.e., in the time between normal packet processing.

It is apparent that the teachings of the present invention enable local-area-network modeling to be performed in a more-reliable more-flexible manner. The present invention thus constitutes a significant advance in the art.

What is claimed as new and desired to be secured by Letters Patent of the United States is:

1. A system for monitoring traffic on a local-area network that includes a traffic-bearing communications bus that conducts signal packets, the system comprising:
   A. a statistics-bearing communications bus for conducting signal packets;
   B. a plurality of stations, connected to the traffic-bearing communications bus, for sending and receiving signal packets;
   C. a monitor unit, connected to the traffic-bearing communications bus at a point between two of the stations, for detecting predetermined characteristics of the signal packets and connected to the statistics-bearing communications bus for transmission of packets thereon, for compiling statistics from the detected characteristics, and for transmitting, over the statistics-bearing communications bus, packets representing the compiled statistics; and
   D. a host unit, connected to the statistics-bearing communications bus, for receiving the packets sent by the monitor unit and generating a human-readable indication of the contents thereof.

2. A system as defined in claim 1 wherein the traffic-bearing and statistics-bearing communications buses are the same bus.

3. A system as defined in claim 1 wherein:
   A. the system further includes a second monitor unit, connected to the traffic-bearing communications bus to detect predetermined characteristics of the signal packets and connected to the statistic bearing communications bus for transmission of packets thereon, for compiling statistics from the detected characteristics and transmitting, over the statistics-bearing communications bus, packets representing the compiled statistics; and
   B. the host unit receives the packets sent by the second monitor unit and generates a human-readable indication of the contents thereof.

4. For monitoring the traffic on a local-area network that includes a communications bus for conducting signal packets, a monitor unit comprising:
   A. an index memory, including an ordered group of index-memory locations, each memory location including a tag segment and a pointer segment;
   B. a plurality of counters, each counter being associated with a different address, containing a count value, and being operable to increment its count value;
   C. reading means for reading the field contents of a predetermined field in the signal packet;
   D. search means responsive to the reading means for performing a binary search through the tag contents of the index memory to identify the index-memory location, if any, whose tag segment contains the contents of the predetermined field;
   E. means responsive to the search means, when the search means finds the contents of the predetermined field in the tag segment of one of the index-memory locations, to increment the contents of the counter whose address is contained in the pointer segment of the index-memory location that contains the contents of the detected contents it the tag contents; and
   F. means responsive to the search means, when the search means fails to find the contents of the predetermined field in the tag segment of one of the index-memory locations, to enter the contents of the predetermined field in the tag segment of an index-memory location chosen so that the contents of the tag segments of the index-memory locations are in the same order as the locations themselves and the tag contents can thereby be searched by means of a binary search, to allocate to the field contents read by the reading means a counter whose address is not contained in any of the pointer segments of the index-memory locations, and to enter the address of the allocated counter into the pointer segment of the index-memory location into whose tag location the read field location was entered.

5. A system for monitoring packet characteristics in a local area network comprising:
   A. a plurality of addressable counters;
   B. means for detecting the occurrence of a predetermined packet characteristic, and for assigning the packet characteristic to one of the plurality of addressable counters;
   C. a look-up table having a plurality of memory locations, each memory location having contents including a tag segment and an address-pointer segment, each tag segment associated with a particular packet characteristic, and each address-pointer segment containing an address of one of the counters;
   D. means for dynamically configuring the contents of the look-table so as to monotonically arrange the tag segments.

6. A system for monitoring traffic on a local-area network, the system comprising:
   A. traffic-bearing communications means for conducting signal packets;
   B. statistics-bearing communications means for conducting signal packets;
   C. monitor unit means, connected to the traffic-bearing communications means and to the statistics-bearing communications means, for detecting predetermined traffic characteristics of the signal packets conducted on the traffic-bearing means, for compiling traffic statistics from the detected characteristics, and for transmitting over the statistics-bearing communications means, packets representing compiled traffic statistics; and
   D. host unit means, connected to the statistics-bearing communications means, for receiving the packets sent by the monitor unit means and generating a human-readable indication of the contents thereof.

7. An apparatus as in claim 6 wherein the monitor unit means detects source address characteristics and compiles source-address statistics.

8. An apparatus as in claim 6 wherein the monitor unit means detects destination-address characteristics and compiles destination-address statistics.

9. An apparatus as in claim 6 wherein the monitor unit means detects protocol-type characteristic and compiles protocol-type statistics.

10. An apparatus as in claim 9 wherein the monitor unit means detects source address characteristics and compiles source address statistics.

* * * * *